United States Patent
Rhim et al.

(10) Patent No.: US 12,557,521 B2
(45) Date of Patent: Feb. 17, 2026

(54) VIEWING ANGLE CONTROL FILM AND DISPLAY DEVICE COMPRISING THE SAME

(71) Applicant: LG Display Co., Ltd., Seoul (KR)

(72) Inventors: Jusang Rhim, Paju-si (KR); Jigon Kim, Paju-si (KR); Sunbok Song, Paju-si (KR); Eunhee Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 683 days.

(21) Appl. No.: 17/977,366

(22) Filed: Oct. 31, 2022

(65) Prior Publication Data

US 2023/0217782 A1  Jul. 6, 2023

(30) Foreign Application Priority Data

Dec. 30, 2021 (KR) ........................ 10-2021-0193167

(51) Int. Cl.
*H10K 59/50* (2023.01)

(52) U.S. Cl.
CPC .................................... *H10K 59/50* (2023.02)

(58) Field of Classification Search
CPC ...................................................... H10K 59/50
See application file for complete search history.

(56) References Cited

U.S. PATENT DOCUMENTS

| | | | | |
|---|---|---|---|---|
| 2018/0252949 A1* | 9/2018 | Klippstein | ............ | G02F 1/1323 |
| 2019/0162997 A1* | 5/2019 | Asakura | ................ | G02F 1/1343 |
| 2020/0033689 A1* | 1/2020 | Lee | ........................ | G02F 1/1368 |
| 2021/0294003 A1* | 9/2021 | Roehrig | ................. | G02B 5/003 |
| 2023/0205040 A1* | 6/2023 | Song | ...................... | H10K 59/50 |
| | | | | 359/296 |
| 2023/0324759 A1* | 10/2023 | Son | ....................... | G02F 1/1681 |
| | | | | 359/296 |

FOREIGN PATENT DOCUMENTS

| KR | 10-2195645 B1 | 12/2020 |
|---|---|---|
| KR | 10-2021-0133482 A | 11/2021 |
| KR | 10-2021-0136433 A | 11/2021 |
| KR | 10-2021-0137792 A | 11/2021 |

* cited by examiner

*Primary Examiner* — Benjamin P Sandvik

(74) *Attorney, Agent, or Firm* — Birch, Stewart, Kolasch & Birch, LLP

(57) ABSTRACT

A viewing angle control film and a display device including the same are discussed. The viewing angle control film can include a first film including a first electrode, a second film facing the first film while being away from the first film by a predetermined distance and including a second electrode, a light conversion layer disposed between the first film and the second film, and an adhesive layer bonding the light conversion layer and the first film. The light conversion layer can include containing portions disposed at regular intervals along the first film between the first film and the second film, a louver layer surrounding the containing portions while spacing the containing portions and the second film, and light blocking particles provided in each of the containing portions.

12 Claims, 21 Drawing Sheets

STEP B8

VIEWING ANGLE CONTROL FILM AND DISPLAY DEVICE COMPRISING THE SAME

CROSS REFERENCE TO RELATED APPLICATION

The present application claims priority to Korean Patent Application No. 10-2021-0193167, filed in the Republic of Korea on Dec. 30, 2021, the entire contents of which are hereby expressly incorporated by reference into the present application.

BACKGROUND OF THE DISCLOSURE

Field

The present disclosure relates to a viewing angle control film and a display device including the same.

Discussion of the Related Art

Along with the development of the information society, a demand for display devices for displaying an image is more and more increasing in a variety of application fields. Accordingly, various display devices such as a liquid crystal display device, a light emitting display device, an organic light emitting display device, a micro light emitting display device, and a quantum dot light emitting display device and so on are recently being utilized.

Such display devices are developed generally to have a wide viewing angle so that a user is able to see images displayed by the display device from various angular directions. However, there is a case where the wide viewing angle of the display device can adversely affect the characteristics of the product, and thus a narrow viewing angle can be needed for the case.

For example, for an automatic bank teller machine (ATM), it is more desirable that the ATM has a display with a narrow viewing angle because, when a user inputs his/her personal information, it needs to prevent other people next to the user from recognizing the personal information. Further, when the viewing angle of the display is wide for a vehicle navigation system, light can be reflected on the windshield of the vehicle during driving the vehicle at night, which can adversely affect the safety of the driver. In addition, for a computer or a mobile phone, if a user does not want to expose the user's privacy data, the wide viewing angle of the display device may not be desirable to meet the user's need.

Therefore, studies for a viewing angle control film capable of adjusting a viewing angle to be suitable for a needed situation have been actively ongoing.

The viewing angle control film can block light from a specific direction and transmit light from a specific direction by controlling a travel path of light, thereby controlling a user's viewing angle.

Meanwhile, in such viewing angle control film, a user can turn on/off the control of the viewing angle, and thus it is possible to block light in a specific direction or to transmit light in a specific direction by dispersion and agglomeration of light blocking particles according to an electrical signal.

In this case, when the viewing angle control film is exposed to a low temperature environment of 5 degrees Celsius or less, the electrical signal can be weakly applied to the light blocking particles, which can cause a limitation that the driving performance and reliability of the viewing angle control film can be reduced.

SUMMARY OF THE DISCLOSURE

In order to address the above and other limitations associated with the related art, the present disclosure provides a viewing angle control film having an improved driving performance and reliability even in a low-temperature environment, and a display device including the same.

A viewing angle control film according to an embodiment of the present disclosure can include: a first film including a first electrode; a second film facing the first film while being away from the first film by a predetermined distance and including a second electrode; a light conversion layer disposed between the first film and the second film; and an adhesive layer bonding the light conversion layer and the first film, wherein the light conversion layer includes a plurality of containing portions disposed at regular intervals along the first film between the first film and the second film; a louver layer surrounding the plurality of containing portions while spacing the plurality of containing portions and the second film; and light blocking particles provided in each of the plurality of containing portions, wherein the adhesive layer can be partially interposed between the light conversion layer and the first film.

Each of the containing portions can include a lower surface coupled to the first film; an upper surface spaced apart from the second film; and side surfaces connecting the lower surface and the upper surface.

The louver layer can surround the upper surface and the side surfaces of the containing portion.

The louver layer can include a plurality of partition walls formed to be spaced apart from each other at regular intervals; and a base layer disposed between the plurality of containing portions and the second film and connecting the partition walls to each other.

The louver layer can include a plurality of partition walls formed to be spaced apart from each other at regular intervals. Each of the partition walls can include a first surface coupled to the first film; a base layer coupled to the second film; and second surfaces connecting the first surface and the base layer.

The adhesive layer can be interposed between the first surface and the first film, and can bond the louver layer and the first film.

The adhesive layer can cover all of the first surface and a portion of the second surface.

The first surface can include at least one groove, and a portion of the adhesive layer can be inserted into the groove.

The adhesive layer can be interposed between a first region of the first surface and the first film, and a second region of the first surface can be in direct contact with the first film.

The first surface can have a predetermined inclination angle with respect to the first film.

The first electrode can be formed of a plurality of electrodes disposed spaced apart from each other at regular intervals along the first film, and each of the plurality of electrodes can be disposed at a position corresponding to the lower surface of the containing portion.

A viewing angle control film according to this embodiment can further include a primer layer made of an acrylic material, and the primer layer can be interposed between the first electrode and the adhesive layer, or between the second electrode and the light conversion layer.

A display device according to an embodiment of the present disclosure can include a display panel for displaying an image, with pixels disposed thereon; and the viewing angle control film as described above. The viewing angle control film can be disposed on the display panel, and can operate in a first mode in which light emitted from the display panel is controlled to be emitted only within a predetermined angle range, or in a second mode in which light emitted from the display panel is controlled to be emitted beyond the predetermined angle range.

The viewing angle control film and the display device including the same according to an embodiment of the present disclosure can address the limitation that the driving performance in the private mode can be reduced under a low-temperature environment.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
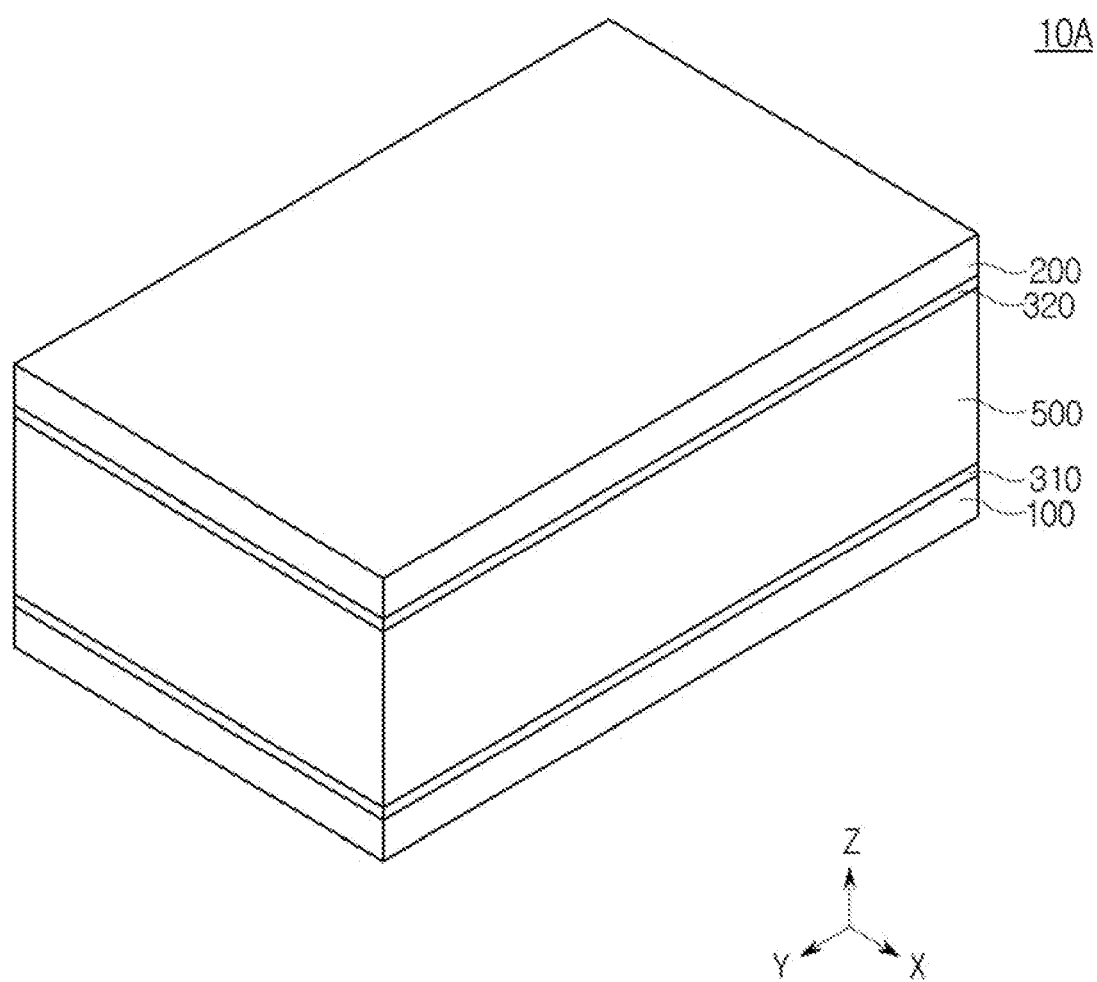
FIG. 1 is a view illustrating a perspective view of a viewing angle control film according to Comparative Embodiment.

The shapes, sizes, ratios, angles, numbers, and the like illustrated in the accompanying drawings for describing the example embodiments of the present disclosure are merely examples, and the present disclosure is not limited thereto. Like reference numerals generally denote like components throughout the present specification. Further, in the following description, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

Although the terms "first", "second", and the like are used for describing various components, these components are not confined by these terms. These terms are merely used for distinguishing one component from the other components, and may not define any order or sequence. Therefore, a first component to be mentioned below can be a second component in a technical concept of the present disclosure.

Throughout the entire specification, the same reference numerals denote the same components.

Hereinafter, various example embodiments of the present disclosure will be described in detail with reference to the accompanying drawings. The names of the components are selected by considering the ease for explanation, so they can be different from actual names. Further, all the components of each viewing angle control film and each display device including the same according to all embodiments of the present disclosure are operatively coupled and configured.

COMPARATIVE EMBODIMENT

FIGS. 1 to 5 are views related to Comparative Embodiment.

Figure 2:
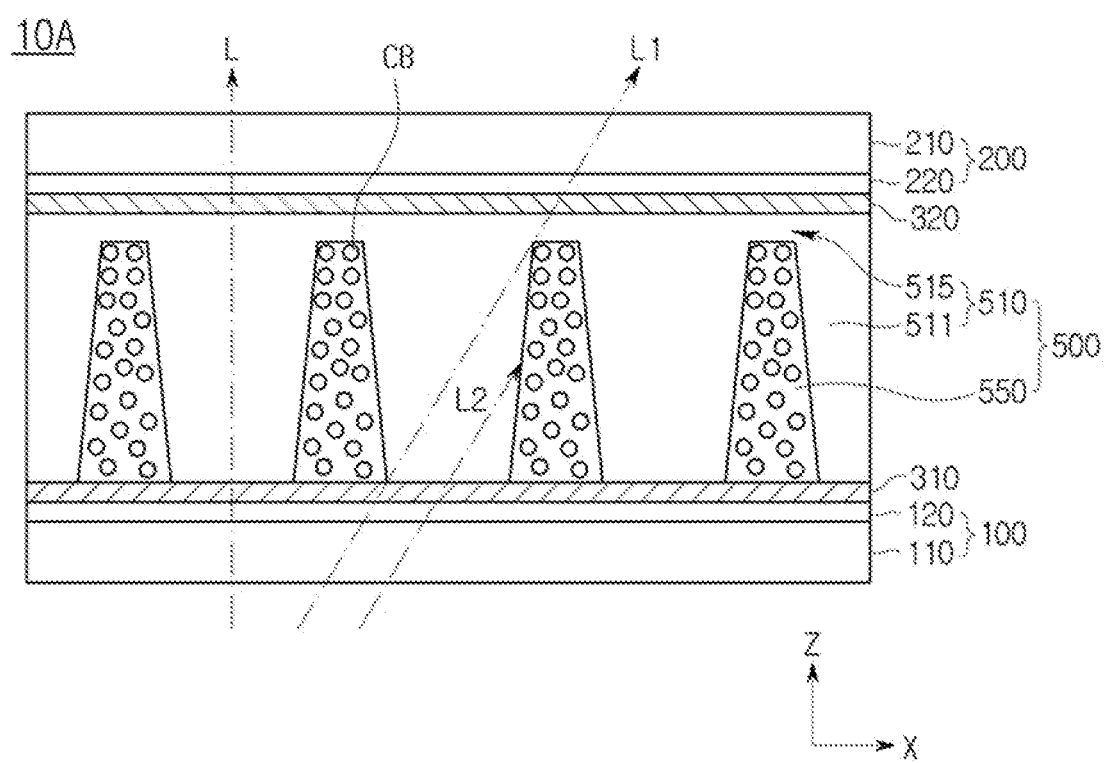
FIG. 2 is a partial view of FIG. 1 for explaining a light path in a private mode.
Figure 3:
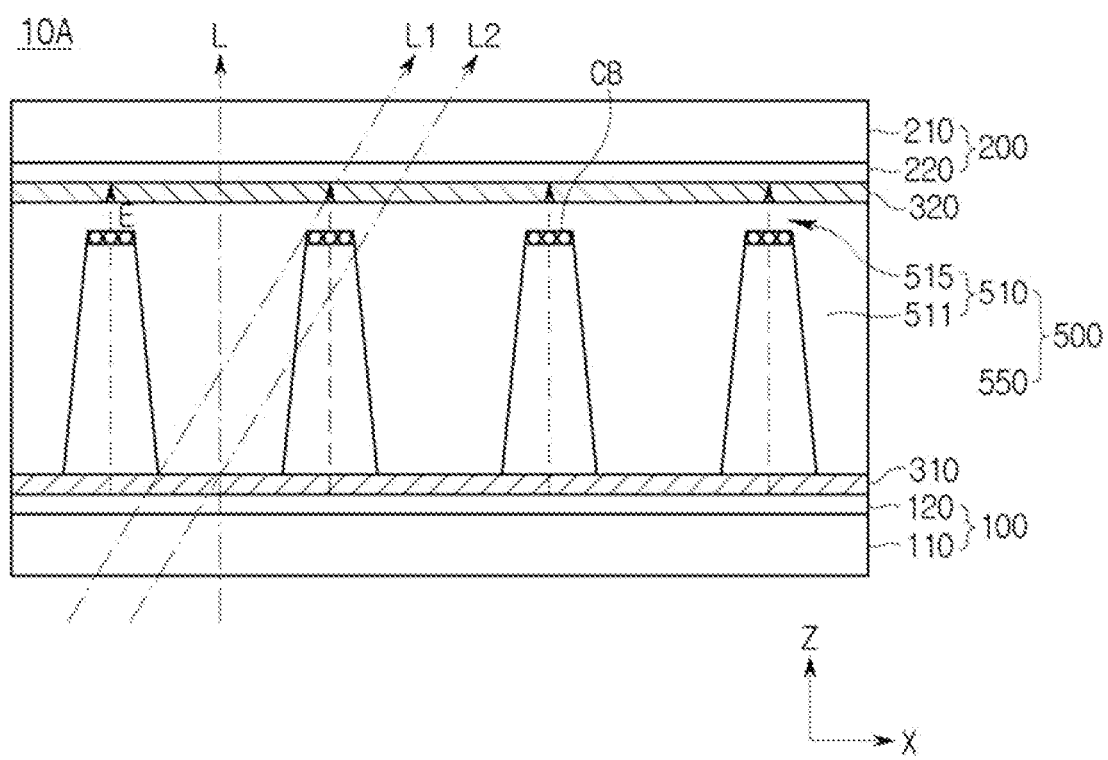
FIG. 3 is a partial view of FIG. 1 for explaining a light path in a share mode.

Particularly, FIG. 1 is a view illustrating a perspective view of a viewing angle control film. FIG. 2 is a partial view of FIG. 1 for explaining a light path in a private mode. FIG. 3 is a partial view of FIG. 1 for explaining a light path in a share mode.

Referring to FIGS. 1 to 4, a viewing angle control film 10A according to Comparative Embodiment includes a first film, a second film, a light conversion layer, and an adhesive layer.

The viewing angle control film 10A is coupled to a display panel, and thus can constitute a display device that controls light emitted from the display panel according to an operation mode. For example, the viewing angle control film 10A can control the light emitted from the display panel in such a manner that it is coupled to a side from which the light is emitted from the display panel so that the light emitted from the display panel is emitted only within a predetermined angle range, and shields the light outside the predetermined angle range. Further, the viewing angle control film 10A can allow the light emitted from the display panel to be emitted beyond the predetermined angle range.

Hereinafter, emitting the light from the display panel only within the predetermined angle range is referred to as a "private mode" (or narrow viewing angle mode), and emitting the light from the display panel beyond the predetermined angle range is referred to as a "share mode" (or wide viewing angle mode). For example, the viewing angle control film 10A can be driven by being switched to the private mode or the share mode.

The viewing angle control film 10A includes a first film 100, a first adhesive layer 310 disposed on the first film 100, a light conversion layer 500 disposed on the first adhesive layer 310, and a second adhesive layer 320 disposed on the light conversion layer 500, and a second film 200 disposed on the second adhesive layer 320.

The first film 100 can be disposed at a lowermost side of the viewing angle control film 10A. When the viewing angle control film 10A is coupled to the display panel, the first film 100 can be a portion coupled to the display panel. The first film 100 can be coupled to the display panel through a transparent adhesive or the like.

The first film 100 includes a first base film 110 and a first electrode 120. The first electrode 120 can be disposed on an upper surface of the first base film 110. The first electrode 120 can include a transparent conductive material. For example, the first electrode 120 can include at least one metal among chromium (Cr), nickel (Ni), copper (Cu), aluminum (Al), silver (Ag), or molybdenum (Mo), gold (Au), titanium (Ti), and an alloy thereof. The first electrode 120 is for forming an electric field E in the viewing angle control film 10A. The first electrode 120 is connected to a voltage supplier, and thus can contribute to the formation of an electric field E according to a voltage supplied by the voltage supplier.

The second film 200 can be disposed to face the first film 100 while being away from the first film 100 by a predetermined distance. The first and second adhesive layers 310 and 320 and the light conversion layer 500 can be disposed between the first film 100 and the second film 200.

The second film 200 can be disposed at the uppermost side of the viewing angle control film 10A. When the viewing angle control film 10A is coupled to the display panel, the second film 200 can be a portion where the light emitted from the display panel finally passes.

Figure 4:
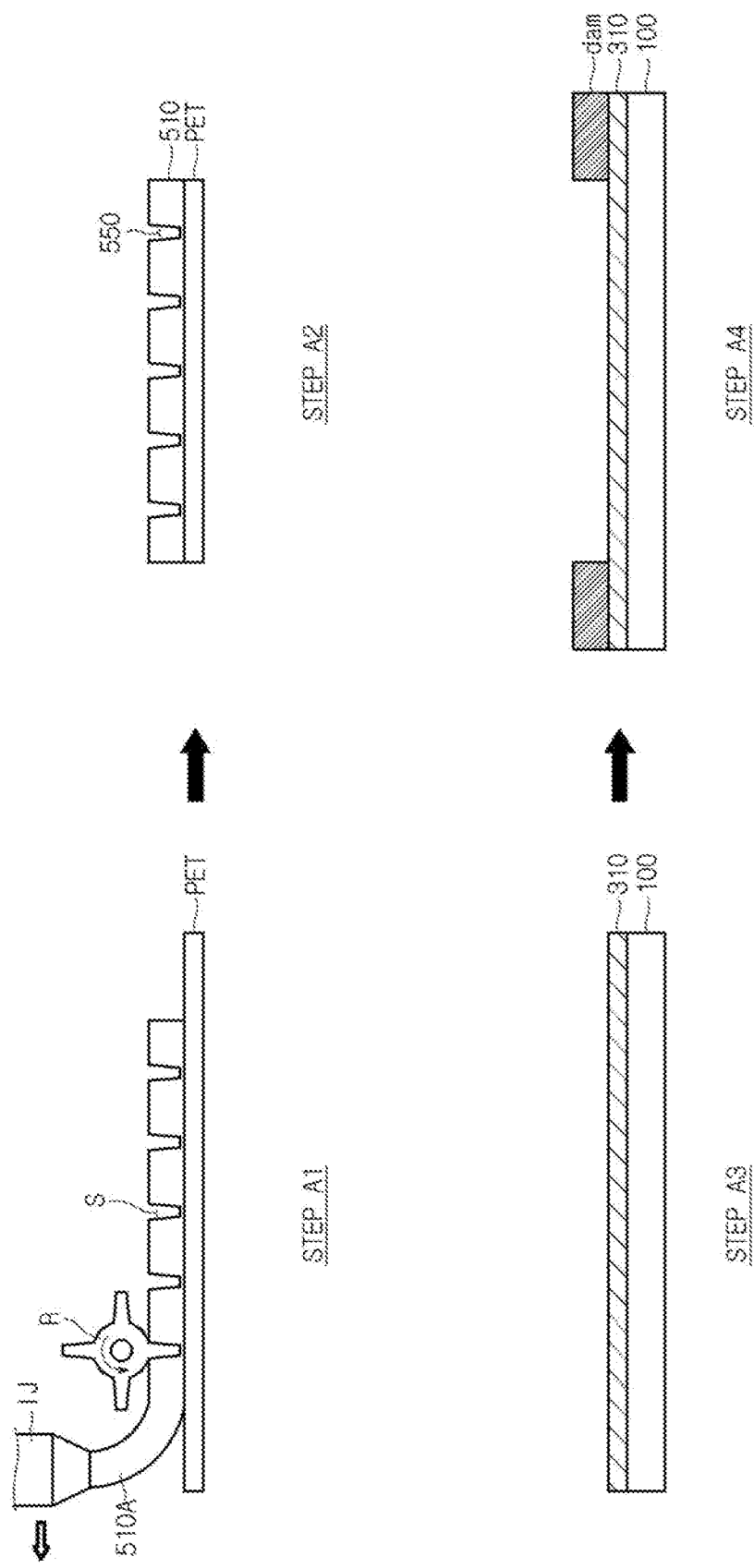
FIGS. 4 and 5 are views of a schematic manufacturing method of the viewing angle control film according to Comparative Embodiment.

The second film 200 can have a same shape and thickness as the first film 100. The second film 200 includes a second base film 210 and a second electrode 220. The second electrode 220 can be disposed on a lower surface of the second base film 210. Like the first electrode 120, the second electrode 220 can include a transparent conductive material. The second electrode 220 is connected to the voltage supplier, and thus can form an electric field E together with the first electrode 120. When an electric field E is formed between the first electrode 120 and the second electrode 220 according to the voltage supplied by the voltage supplier, the share mode can be implemented as shown in FIG. 4. In addition, since an electric field E is not formed between the first electrode 120 and the second electrode 220 when the voltage supplier does not supply a voltage, then the private mode can be implemented as shown in FIG. 2.

The light conversion layer 500 can be disposed between the first film 100 and the second film 200. Specifically, the light conversion layer 500 can be disposed between the first electrode 120 and the second electrode 220. The light conversion layer 500 includes a plurality of containing portions 550 and a louver layer 510 surrounding the plurality of containing portions 550.

The containing portion 550 is divided into a plurality of regions by the louver layer 510. The containing portion 550 include dispersing agent and light blocking particles CB.

The dispersing agent can be a material for dispersing the light blocking particles CB. The dispersing agent can include a transparent material. The dispersing agent can include a non-polar solvent. The dispersing agent can include a material capable of transmitting light. For example, the dispersing agent can include at least one material of halocarbon-based oil, paraffin-based oil, and isopropyl alcohol. The light blocking particles CB can be light-absorbing particles.

The light blocking particles CB can have a color. The light blocking particles can have a black-based color. For example, the light blocking particles CB can include an opaque material such as a metal material, a metal oxide material, or a nitride material. More specifically, it can include any one selected from carbon, silicon nitride (SiN), titanium nitride (TiN), silicon carbide (SiC), tantalum (Ta), titanium (Ti), tungsten (W), copper oxide (CuO), aluminum oxide ($Al_2O_3$), iron oxide ($Fe_3O_4$), and tantalum oxide ($Ta_2O_5$). In addition, the light blocking particles CB can be formed of an organic material having an excellent light absorption property. The light blocking particles CB can have a charged surface. Accordingly, the light blocking particles CB can move in one direction according to the applied electric field E. The light blocking particles CB can be provided as a material including a plurality of carbon particles in oil, and the carbon particles can shield light by absorbing the light. Here, the private mode can be implemented. Hereinafter, it will be described based on the light blocking particles CB including the carbon particles as an example.

The louver layer 510 includes a plurality of partition walls 511 formed to be spaced apart from each other at regular intervals. Within the light conversion layer 500, the partition wall 511 and the containing portion 550 can be alternately disposed along one direction. The partition wall 511 and the containing portion 550 can have the same or different widths in one direction. In one example, the louver layer 510 can further include a base layer 515 connecting the partition walls 511 to each other. The base layer 515 is a feature according to the imprinting manufacturing method, and is not a configuration essentially necessary to form the viewing angle control film 10A.

An adhesive layer can be disposed between the light conversion layer 500 and the first film 100 or between the light conversion layer 500 and the second film 200. For example, the first adhesive layer 310 can be interposed between the light conversion layer 500 and the first electrode 120. In addition, the second adhesive layer 320 can be interposed between the light conversion layer 500 and the second electrode 220.

The adhesive layers 310 and 320 can be composed of either an optical clear adhesive (OCA) or an optical clear resin (OCR), but not limited thereto, and can be composed of a different material as long as it can adhere the light conversion layer 500 and the first film 100, or the light conversion layer 500 and the second film 200 to each other. The adhesive layers 310 and 320 can be formed of a transparent material.

In the private mode of FIG. 2, an electric field E is not formed between the first electrode 120 and the second electrode 220. Accordingly, the light blocking particles CB in the containing portion 550 are in a dispersed state. Since the light blocking particles CB absorb light, the containing portion 550 shields the light. In the private mode, the viewing angle control film 10A passes most of the front light L, but the inclined lights L1 and L2 out of the predetermined angle range are mostly shielded by the containing portion 550, thereby providing a narrow viewing angle.

In the share mode of FIG. 3, an electric field E is formed between the first electrode 120 and the second electrode 220.

Accordingly, the light blocking particles CB in the containing portion 550 are agglomerated in an upper portion or a lower portion in the Z-axis direction. FIG. 3 illustrates agglomerating of the particles in the upper portion. The agglomeration position can be adjusted according to the direction of the electric field E formed between the first electrode 120 and the second electrode 220 or the polarity of the light blocking particles CB. In the share mode, since the light blocking particles CB absorbing light are agglomerated at one side, the viewing angle control film 10A allows passing of not only the front light L but also most of the inclined lights L1 and L2 that are out of the predetermined angle range. Accordingly, a wide viewing angle is provided.

Figure 5:
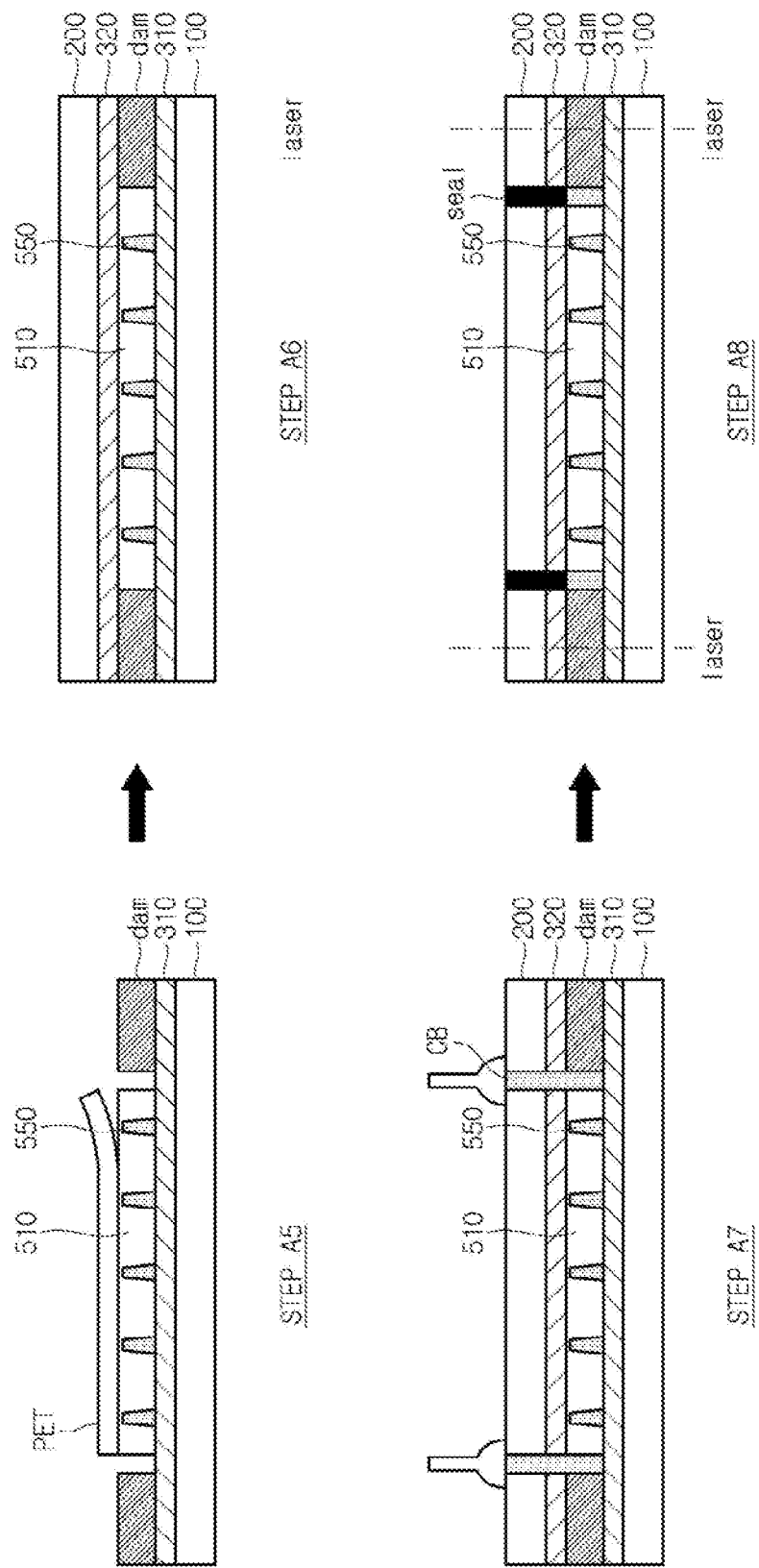

FIGS. 4 and 5 are views of a schematic manufacturing method of the viewing angle control film 10A according to Comparative Embodiment.

Referring to FIGS. 4 and 5, Step A1 is a step of manufacturing the louver layer 510 by an imprinting method. The louver layer 510 is formed on an upper surface of a base film PET by the imprinting method. A louver layer solution 510A is, by using an injection IJ, applied to the upper surface of the base film PET while moving in one direction, and a roller R having a pattern thereon rotates while pressing the applied louver layer solution 510A when moving along the injection IJ with keeping away from the injection IJ by a predetermined distance, thereby forming the louver layer 510 having a space S which is to be filled as the containing portion 550. On the other hand, since what the injection IJ applies is the louver layer solution 510A, even if the roller R is deeply inserted to the base film PET, a base layer 515 can be formed as shown in FIGS. 2 and 3 due to the cohesive property of the solution when the roller R passes. The base layer 515 can be provided below the space S.

Step A2 is a step of cutting the louver layer 510 that is formed on the upper surface of the base film PET by the imprinting method.

Step A3 is a step of entirely forming the first adhesive layer 310 on the first film 100. The first electrode 120 is formed on an upper surface of the first film 100. The first adhesive layer 310 is for adhering the louver layer 510 and the first electrode 120 of the first film 100 together. The first adhesive layer 310 can be provided as at least one of a thermally-curable type material and a photocurable type material.

Step A4 is a step of forming a dam on a side region of the first film 100.

Step A5 is a step of inverting the louver layer 510 in the vertical direction, bonding it with the first film 100, and removing the base film PET from the louver layer 510.

Step A6 is a step of bonding the second film 200 to an upper surface of the louver layer 510. The second adhesive layer 320 is entirely formed on the second film 200, like the first adhesive layer 310 formed on the first film 100. Then, the second film 200 is inverted in the vertical direction and the second film 200 is bonded to the upper surface of the louver layer 510 via the second adhesive layer 320.

Step A7 is a step of injecting light blocking particles CB. The light blocking particles CB are contained in the containing portion 550.

Step A8 is a step of, after sealing side surfaces of the viewing angle control film 10A, cutting the edge including a part of the dam with a laser beam.

FIGS. 1 to 3 are views showing only a portion in which the sealing layer and the dam are excluded from FIG. 4.

The inventors of the present disclosure have discovered the following limitations in Comparative Embodiment.

The first limitation is that the adhesive layers 310 and 320 are present between the first film 100 and the light conversion layer 500 and between the second film 200 and the light conversion layer 500, respectively. The private mode is operated by changing an arrangement of the light blocking particles by the electric field E formed between the first electrode 120 of the first film 100 and the second electrode 220 of the second film 200, but the adhesive layers 310 and 320 increase a distance between the first electrode 120 and the second electrode 220, thereby weakening the electric field E applied to the containing portion 550 containing the light blocking particles CB.

The second limitation is that, since the viewing angle control film 10A has the sealing layer and the dam in the edge thereof, it can have a disadvantage of difficulty in realizing a narrow bezel when attached to the display panel to configure a display device capable of controlling a viewing angle.

In order to address the limitations of Comparative Embodiment, the inventors of the present disclosure conceived of Embodiment 1 as below.

Embodiment 1 of the Present Disclosure

FIGS. 6 to 11 are views related to Embodiment 1 of the present disclosure.

Figure 6:
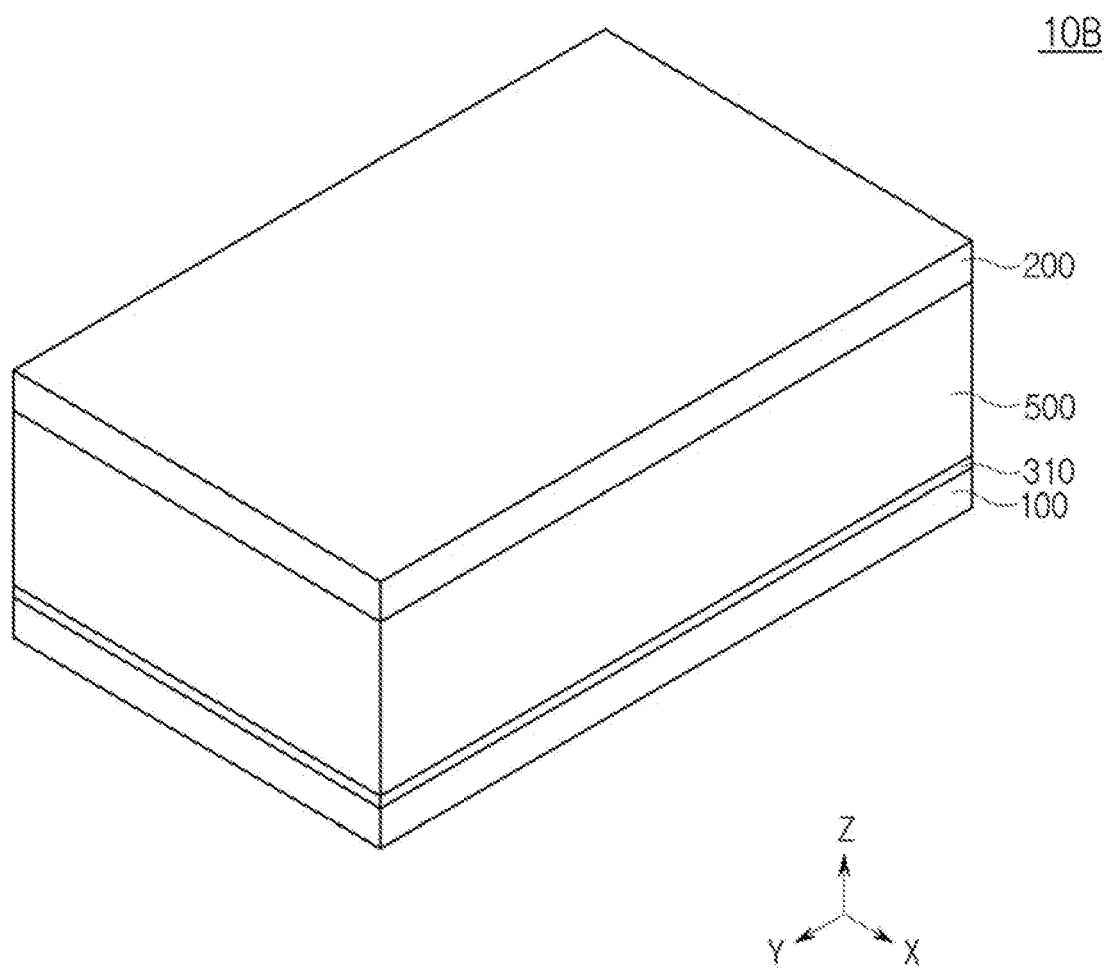
FIG. 6 is a view illustrating a perspective view of a viewing angle control film according to Embodiment 1 of the present disclosure.
Figure 7:
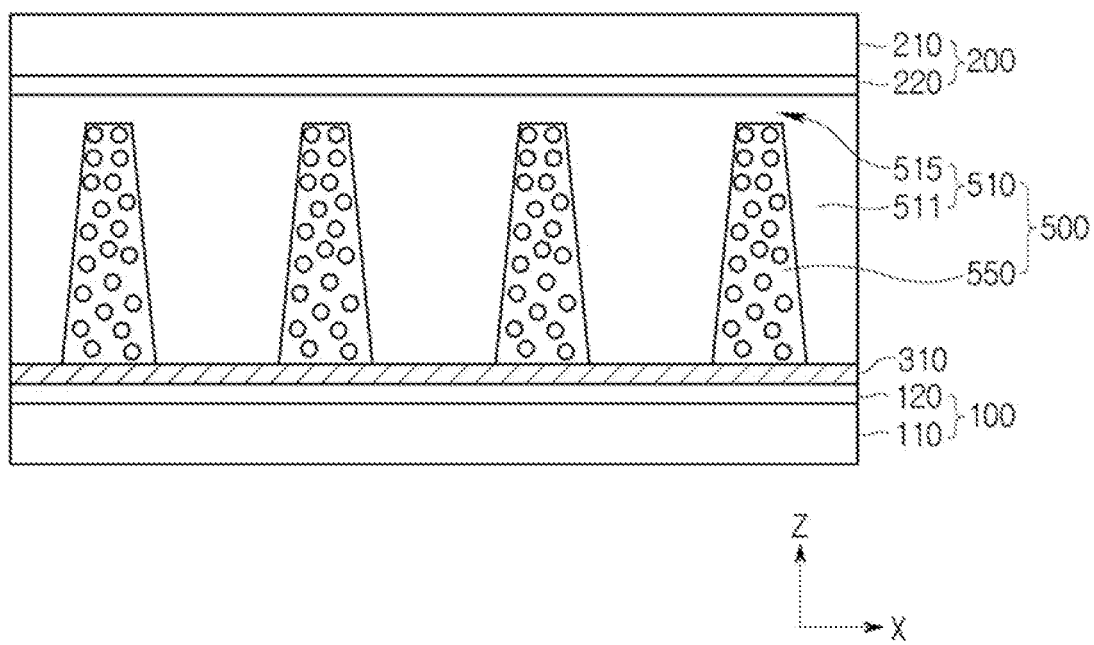
FIG. 7 is a cross-sectional view of FIG. 6.

Particularly, FIG. 6 is a view illustrating a perspective view of a viewing angle control film, and FIG. 7 is a cross-sectional view of FIG. 6.

Referring to FIGS. 6 and 7, it is noted that, unlike FIGS. 1 to 3, a viewing angle control film 10B according to Embodiment 1 only has the adhesive layer interposed between the first film 100 and the light conversion layer 500, and the adhesive layer between the film 200 and the light conversion layer 500 has been removed.

Figure 8:
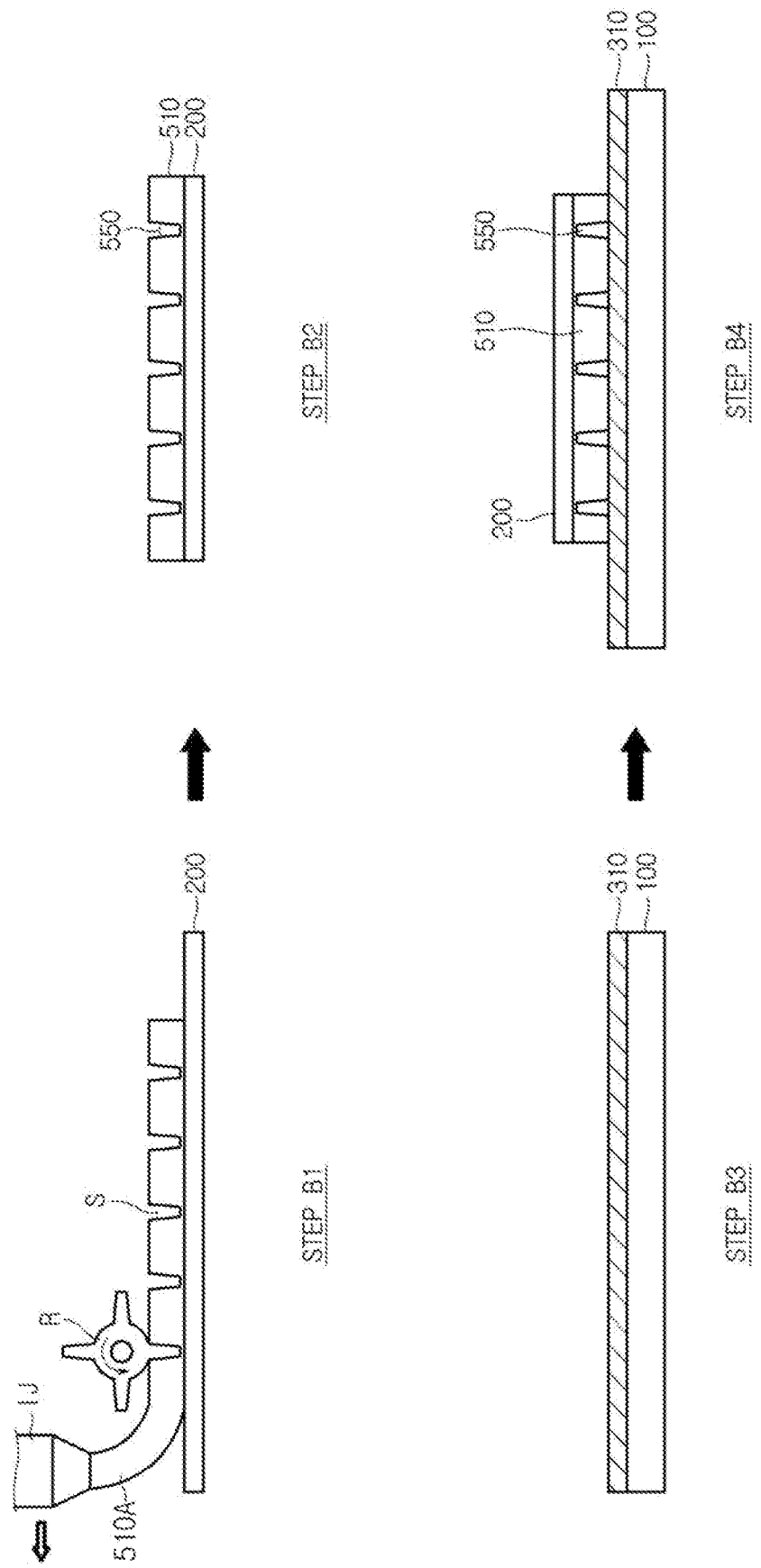
FIGS. 8 to 11 are views of a schematic manufacturing method of the viewing angle control film according to Embodiment 1 of the present disclosure.
Figure 9:
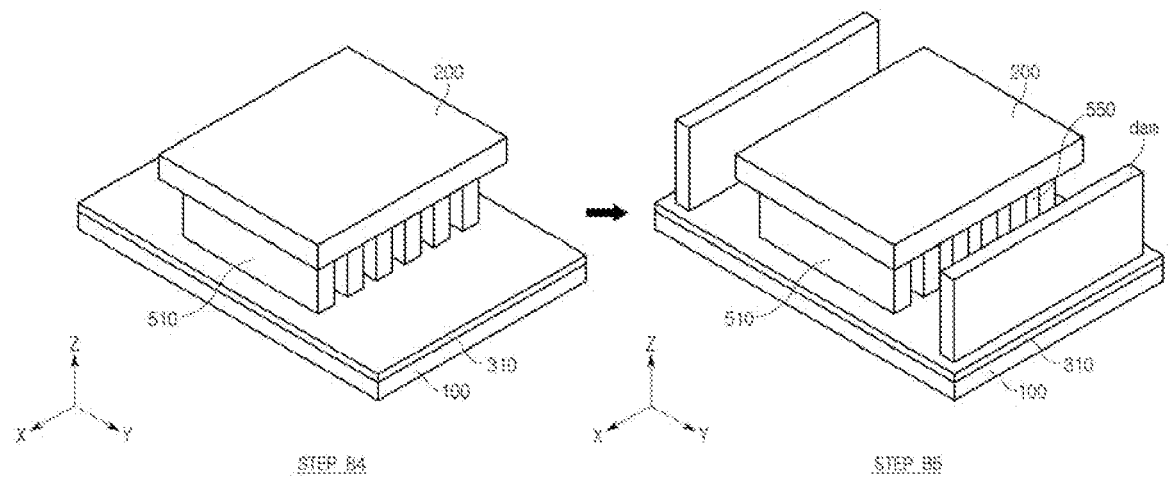
Figure 10:
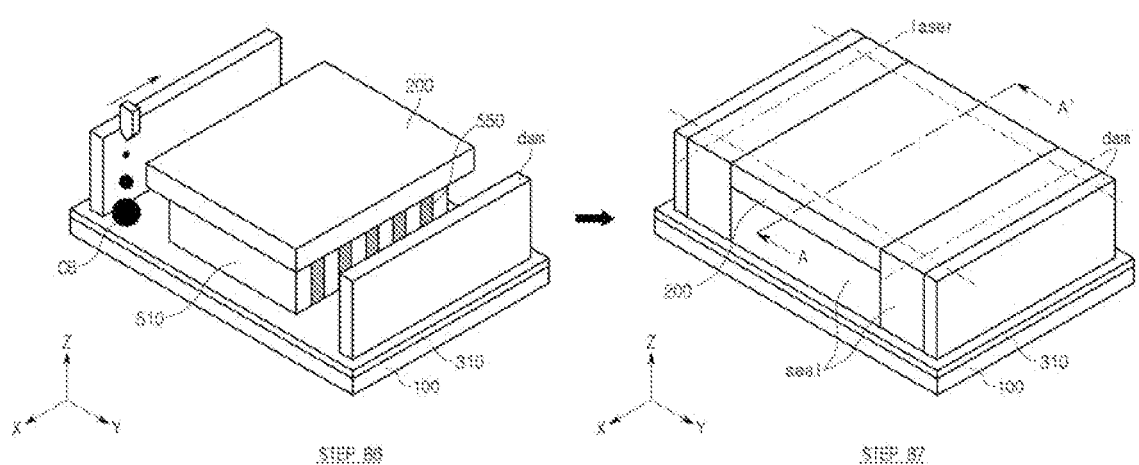

FIGS. 8 to 11 are views of a schematic manufacturing method of the viewing angle control film 10B according to Embodiment 1. FIGS. 9 and 10 are illustrated in perspective views for ease of explanation.

Referring to FIGS. 6-10, Step B1 is a step of manufacturing a louver layer 510 by the imprinting method. Unlike FIG. 4, the louver layer 510 is formed directly on an upper surface of the second film 200. The second electrode 220 is formed on the upper surface of the second film 200, and the louver layer 510 is formed in direct contact with the upper surface of the second electrode 220.

Step B2 is a step of cutting the louver layer 510 that is formed on the upper surface of the second film 200 by the imprinting method.

Step B3 is a step of entirely forming the adhesive layer 310 on the first film 100. The first electrode 120 is formed on the upper surface of the first film 100.

Step B4 is a step of inverting in the vertical direction the second film 200 on which the louver layer 510 is formed and bonding it with the first film 100. The first film 100 and the second film 200 on which the louver layer 510 is formed can be adhered through the first adhesive layer 310. Step B4 is repeatedly indicated with the cross-sectional view of FIG. 8 and the perspective view of FIG. 9.

Step B5 is a step of forming a dam on the first film 100. The dam is arranged such that the containing portion 550 is disposed between the dams.

Step B6 is a step of injecting the light blocking particles CB to the containing portion 550 i.e., between the plurality of partition walls 511 of the louver layer 510. Accordingly, the light blocking particles CB are provided in each containing portion 550.

Step B7 is a step of forming a sealing layer. By forming sealing layers surrounding the louver layer 510 or the containing portion 550, for example in the X-axis direction and the Y-axis direction, the light blocking particles CB provided in the containing portion 550 can be sealed from the outside.

Figure 11:
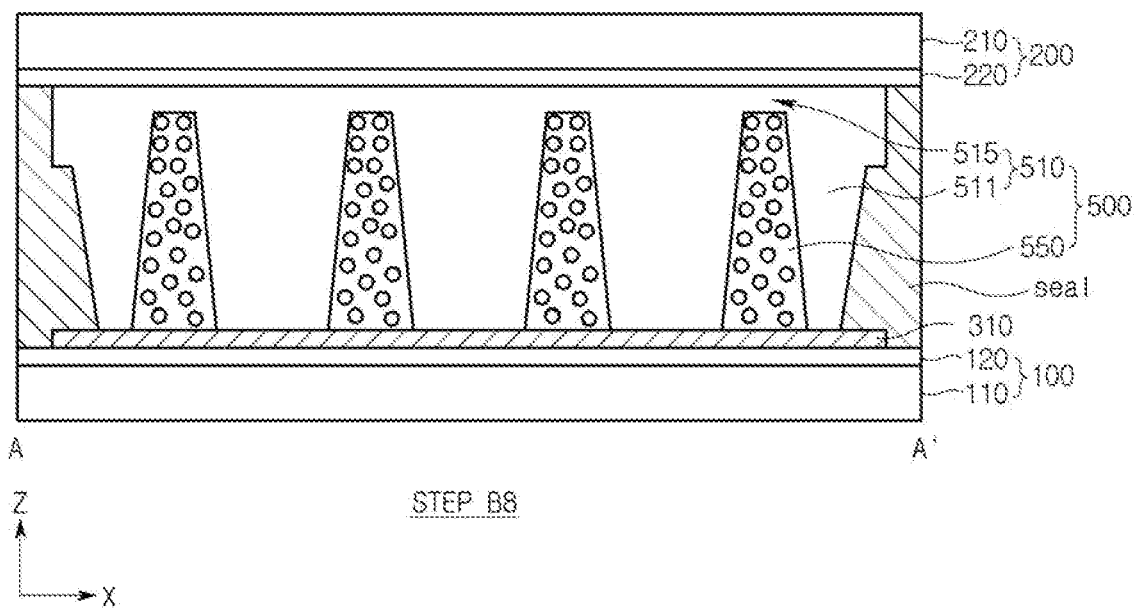

FIG. 11 is a sectional view taken along line A-A' of FIG. 10, in which Step B8 is a step of laser cutting. In Step B8, though a laser cutting along the laser cutting line shown in Step B7, the viewing angle control film 10B can be finally completed. In the case of Embodiment 1, as shown in Step B7, by removing not only a portion of the sealing layer but also the dam, a bezel narrower than that of Comparative Embodiment can be provided. According to Embodiment 1 as above, the adhesive layer between the second film 200 and the light conversion layer 500 is removed, thereby solving the problem of weakening the electric field E applied to the containing portion 550 containing the light blocking particles CB due to the increased distance between the first electrode 120 and the second electrode.

Specifically, referring to FIGS. 1 to 3 of Comparative example, in the case of the Comparative Embodiment, it is noted that the adhesive layers 310 and 320 are present between the first film 100 and the light conversion layer 500, and between the second film 200 and the light conversion layer 500, respectively. The adhesive layers 310 and 320 increase the distance between the first electrode 120 and the second electrode 220, and thus the electric field E applied to the containing portion 550 containing the light blocking particles CB can be weakened, and accordingly the driving performance of the viewing angle control film can be reduced.

On the other hand, in the case of Embodiment 1, as shown in FIGS. 6 to 7, etc., it is different from Comparative Embodiment in that the adhesive layer 310 is only interposed between the first film 100 and the light conversion layer 500, and there is no adhesive layer between the second film 200 and the light conversion layers 500. Accordingly, in the case of Embodiment 1, the limitations associated with Comparative Embodiment can be solved or addressed.

In addition, in the case of Embodiment 1, the dam formed on the edge of the viewing angle control film 10B can be removed, so that when the viewing angle control film 10B is attached to the display panel, a narrow bezel can be provided.

Specifically, referring to FIG. 5 of the Comparative Embodiment, as shown in step A8 of FIG. 5, since the viewing angle control film according to Comparative Embodiment includes the dam as well as the sealing layer on the edge, when configuring a display device capable of controlling a viewing angle by attaching the viewing angle control film of Comparative Embodiment, there can be a difficulty in providing a narrow bezel.

On the other hand, in the case of Embodiment 1, as shown in Step B7 of FIG. 10 and Step B8 of FIG. 11, the viewing angle control film is formed by removing the dam while having only a portion of the sealing layer formed in the upper, lower, left, and right directions of the containing portion 550, and thus, when the viewing angle control film of this embodiment is attached to the display panel to configure a display device capable of controlling a viewing angle, a relatively narrower bezel than that of Comparative Embodiment can be provided.

Figure 12:
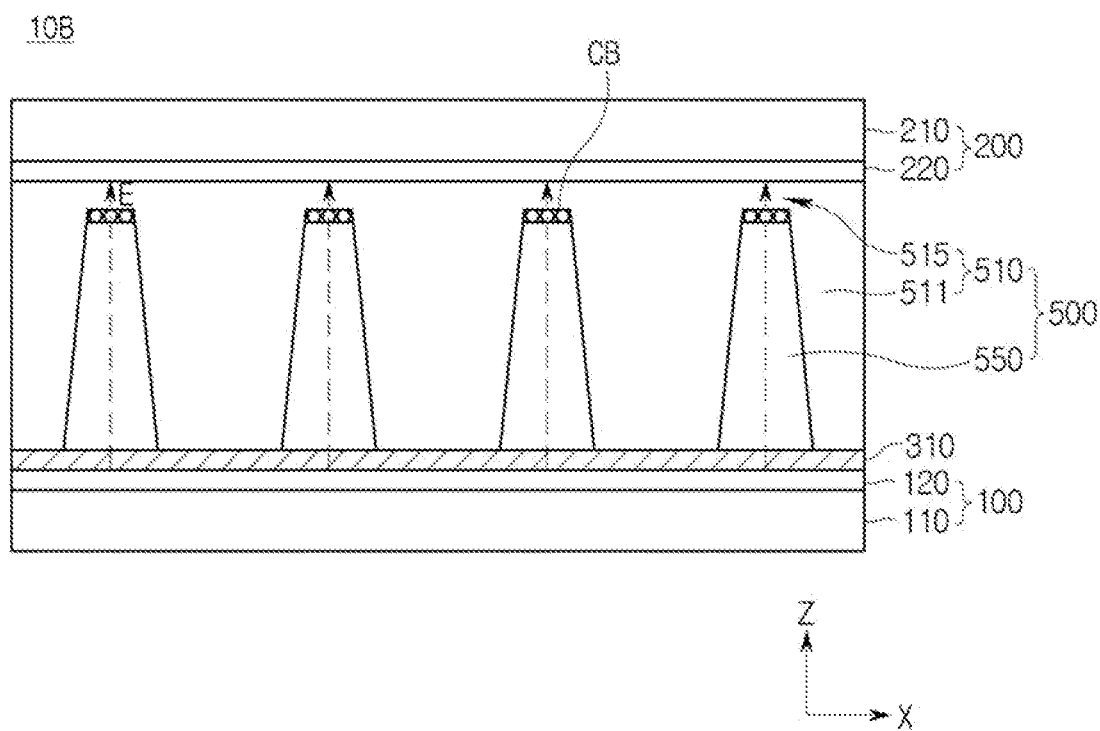
FIG. 12 is a view illustrating the viewing angle control film of Embodiment 1 operating in the share mode.

FIG. 12 is a view showing the viewing angle control film 10B operating in the share mode of Embodiment 1. The inventors of the present disclosure have found that the viewing angle control film 10B according to Embodiment 1 can have poor driving performance in the private mode in a low temperature environment of 5 degrees Celsius or less.

Referring to FIG. 12, an electric field E is formed between the first electrode 120 and the second electrode 220 in the share mode. The light blocking particles CB in the containing portion 550 are agglomerated upward in the Z-axis direction under the influence of this electric field E. Referring to FIG. 12, the containing portion 550 containing the light blocking particles CB does not come into direct contact with the first electrode 120 or the second electrode 220. The first adhesive layer 310 is interposed between the containing portion 550 and the first electrode 120, and a base layer 515 of the louver layer 510 is interposed between the containing portion 550 and the second electrode 220.

In relation to the first electrode 120, although the first electrode 120 is spaced apart from the containing portion 550 with the first adhesive layer 310 interposed therebetween, there is usually no problem in that the electric field E is formed between the first electrode 120 and the containing portion 550 since the first adhesive layer 310 has a sufficient dielectric constant. However, the dielectric constant of the first adhesive layer 310 can become lower as the temperature decreases, and the dielectric constant of the adhesive layer cam be rapidly reduced in a low temperature environment of 5 degrees Celsius or less. When the dielectric constant of the first adhesive layer 310 is lowered, the strength of the electric field E applied to the containing portion 550 through the first electrode 120 can be lowered, so that the driving performance in the private mode can be reduced.

Embodiment 2 of the Present Disclosure

Embodiment 2 of the present disclosure was derived to address the limitations associated with Embodiment 1 described above, in which the driving performance in the private mode may be reduced in a low-temperature environment.

Embodiment 2 is characterized in that the adhesive layer is partially interposed between the light conversion layer 500 and the first film 100.

Figure 13:
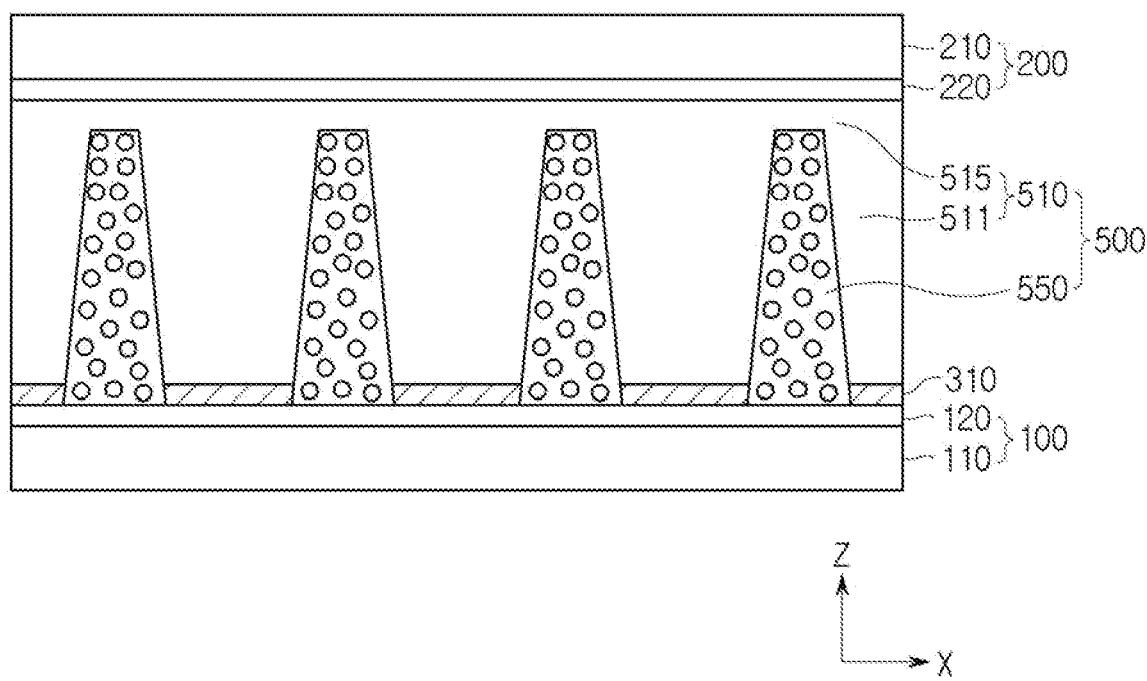
FIG. 13 is a cross-sectional view of a viewing angle control film according to an embodiment of the present disclosure.
Figure 14:
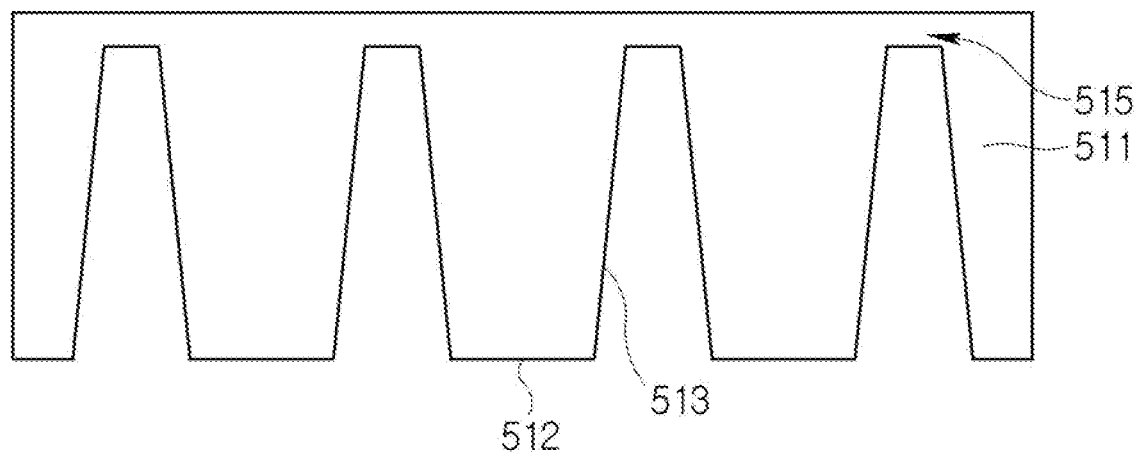
FIG. 14 is an enlarged view of a louver layer according to an embodiment of the present disclosure.
Figure 15:
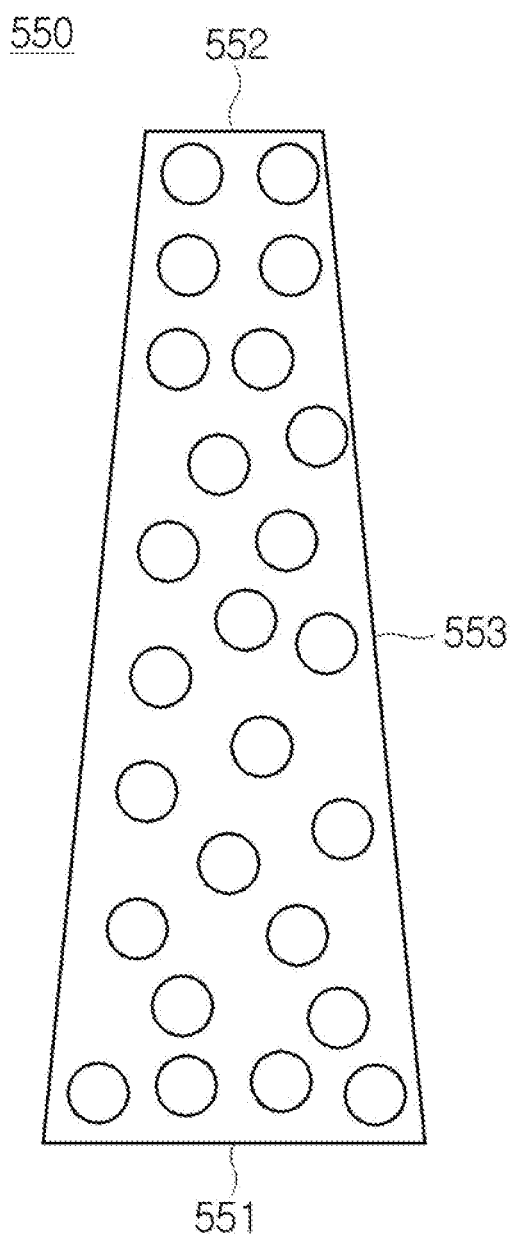
FIG. 15 is an enlarged view of a containing portion according to an embodiment of the present disclosure.

FIG. 13 is a cross-sectional view of the viewing angle control film according to an embodiment of the present disclosure. FIG. 14 is an enlarged view of the louver layer 510 according to an embodiment of the present disclosure. FIG. 15 is an enlarged view of the containing portion 550 according to an embodiment of the present disclosure.

Referring to FIGS. 13-15, a viewing angle control film 10 according to this embodiment includes the first film 100 including the first electrode 120, and the second film 200 facing the first film 100 while being away from the first film 100 by a predetermined distance and including the second electrode 220, the light conversion layer 500 disposed between the first film 100 and the second film 200, and the adhesive layer 310 bonding the light conversion layer 500 and the first film 100.

The conversion layer 500 includes the plurality of containing portions 550 disposed at regular intervals along the first film 100 between the first film 100 and the second film 200; the louver layer 510 surrounding the plurality of containing portions 550 while spacing the plurality of containing portions 550 and the second film 200; and the light blocking particles CB provided in each of the plurality of containing portions 550.

The containing portion 550 can include a lower surface 551, an upper surface 552, and side surfaces 553. The lower surface 551 is a surface in direct contact with the first electrode 120 of the first film 100. The upper surface 552 is a surface spaced apart from the second film 200. The side surfaces 553 are surfaces connecting the lower surface 551 and the upper surface 552. The side surfaces 553 can refer to the left side surface and the right side surface of FIG. 13. As such, since the containing portion 550 according to this embodiment of the present disclosure is in direct contact with the first electrode 120 of the first film 100 through the lower surface 551, the problem that the strength of the electric field applied to the containing portion 550 through the first electrode 120 and the second electrode 220 decreases can be eliminated even if the dielectric constant of the adhesive layer 310 is lowered in a low temperature environment.

The louver layer 510 surrounds the upper surface 552 and the side surfaces 553 of the containing portion 550. The louver layer 510 includes the plurality of partition walls 511 formed to be spaced apart from each other at regular intervals.

The partition wall 511 includes a first surface 512 coupled to the first film 100; a base layer 515 coupled to the second film 200; and second surfaces 513 connecting the first surface 512 and the base layer 515. The base layer 515 is due to the feature of the louver layer 510 manufactured by the imprinting method, and is not a configuration essentially necessary to configure the viewing angle control film 10 of the present disclosure.

The adhesive layer 310 is partially interposed between the conversion layer 500 and the first film 100. Specifically, the adhesive layer 310 is interposed between the first surface 512 of the partition wall 511 and the first electrode 120 of the first film 100 to bond the louver layer 510 and the first film 100.

As such, the adhesive layer 310 is only interposed between the first surface 512 of the partition wall 511 and the first electrode 120 of the first film 100, and is not interposed between the lower surface 551 of the containing portion 550 and the first electrodes 120. For example, the adhesive layer 310 adheres the light conversion layer 500 and the first film 100, and the lower surface 551 of the containing portion 550 is in direct contact with the first electrode 120, and thus, even if the dielectric constant of the adhesive layer 310 is lowered, the electric field applied to the containing portion 550 through the first electrode 120 and the second electrode 220 is not affected thereby. For example, the limitation that the driving performance of the private mode of the viewing angle control film 10 can be reduced in a low temperature environment can be eliminated.

Figure 16:
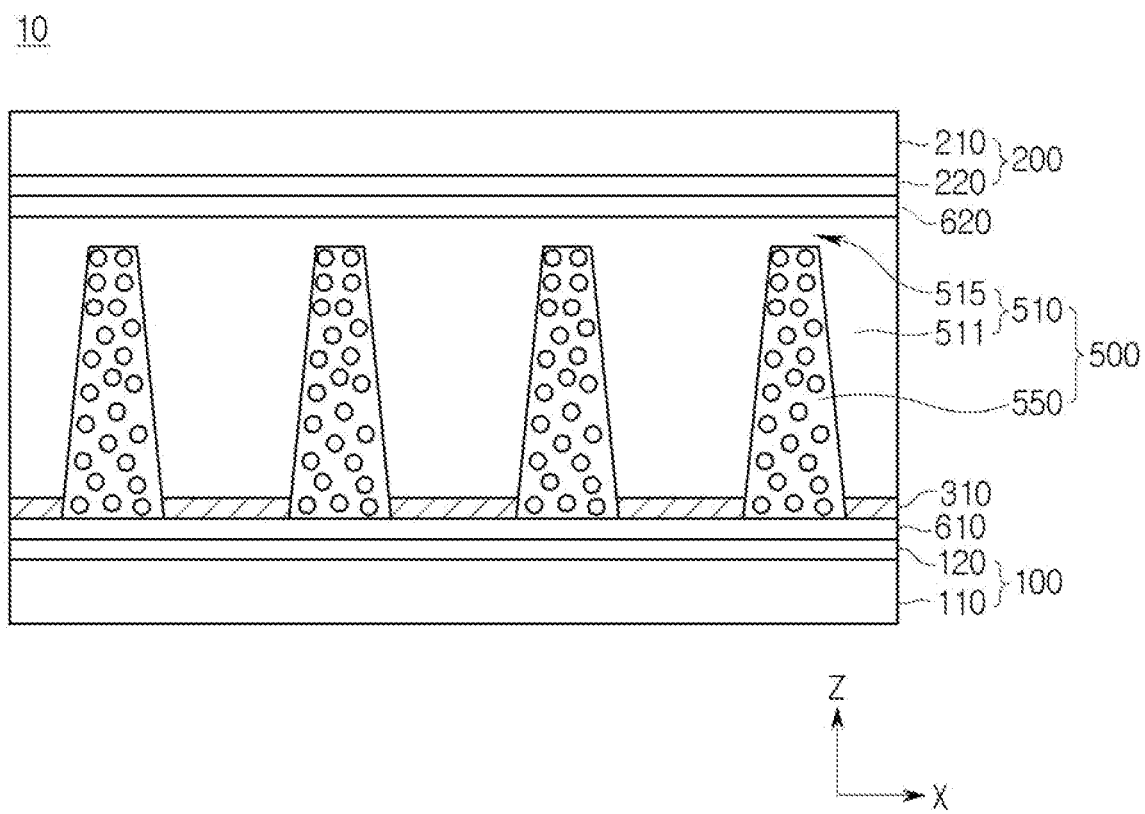
FIG. 16 is a cross-sectional view of a viewing angle control film according to another embodiment of the present disclosure.

FIG. 16 is a cross-sectional view of the viewing angle control film 10 according to another embodiment of the present disclosure.

The viewing angle control film 10 according to this embodiment of FIG. 16 is the same with the embodiment of FIG. 13 described above, except that it further includes first and second primer layers 610 and 620. Accordingly, the same reference numerals are given to the same components, and only different components will be described below.

The viewing angle control film 10 according to this embodiment further includes primer layers 610 and 620. The primer layers 610 and 620 include an acrylic material. The primer layers 610 and 620 include a first primer layer 610 interposed between the first electrode 120 and the adhesive layer, and a second primer layer 620 interposed between the second electrode 220 and the light conversion layer 500. The primer layers 610 and 620 protect the first electrode 120 and the second electrode 220 made of indium tin oxide ITO. When the first electrode 120 or the second electrode 220 made of ITO is exposed as it is, whitening or yellowing can occur due to a redox reaction. In this case, the transmittance of the viewing angle control film 10 can be reduced. The primer layers 610 and 620 also improve adhesion between the different layers. For example, the adhesive strength of the interface between the first electrode 120 and the adhesive layer 310, or the adhesive strength between the second electrode 220 and the louver layer 510 is improved.

Figure 17:
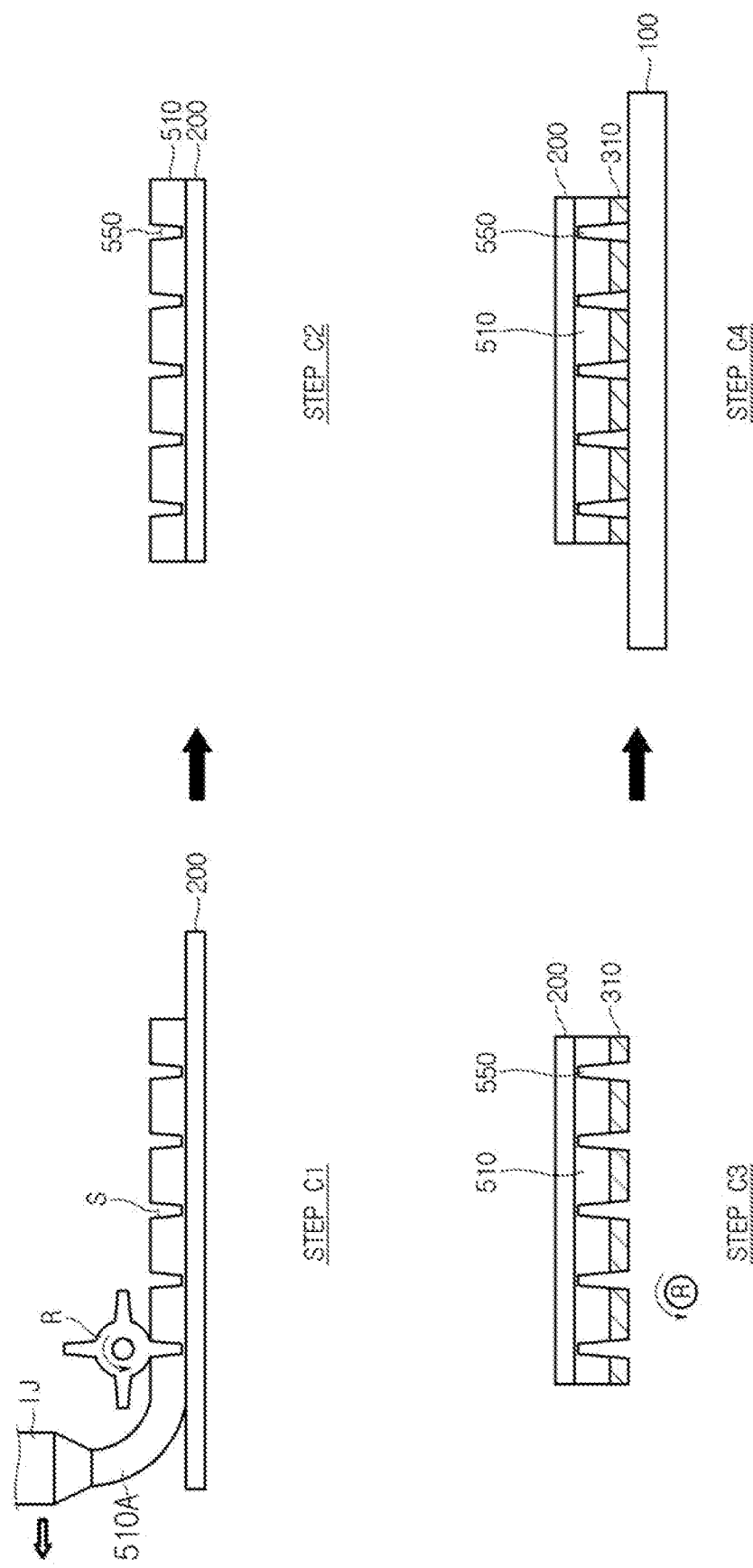
FIG. 17 is a view of a schematic manufacturing method of the viewing angle control film according to an embodiment of the present disclosure.

FIG. 17 is a view of a schematic manufacturing method of the viewing angle control film 10 according to an embodiment of the present disclosure.

Referring to FIG. 17, Steps C1 and C2 are the same as Steps B1 and B2 in FIG. 8. Step C1 is a step of manufacturing the louver layer 510 by the imprinting method, and forms the louver layer 510 directly on an upper surface of the second film 200. Step C2 is a step of cutting the louver layer 510.

Step C3 is a step of, after inverting the louver layer 510 formed on the upper surface of the second film 200 in the vertical direction, coating the adhesive layer 310 on the lower surface 551 of the louver layer 510 using a roller R.

Step C4 is a step of bonding the first film 100 and the second film 200 together. The second film 200 and the first film 100 can be adhered through the adhesive layer 310.

Unlike FIG. 8, which illustrates the manufacturing method of Embodiment 1, in the viewing angle control film 10 according to this embodiment of the present invention, the adhesive layer adheres the louver layer 510 with the first film 100, and particularly the lower surface 551 of the containing portion 550 is in direct contact with the first film 100, and thus, even if the dielectric constant of the adhesive layer 310 is lowered, the electric field applied to the containing portion 550 is not affected thereby. As a result, the problem that the driving performance of the private mode of the viewing angle control film 10 is reduced in a low temperature environment can be eliminated.

The processes thereafter are the same as Steps B5 to B8 of FIGS. 9 to 11.

Figure 18:
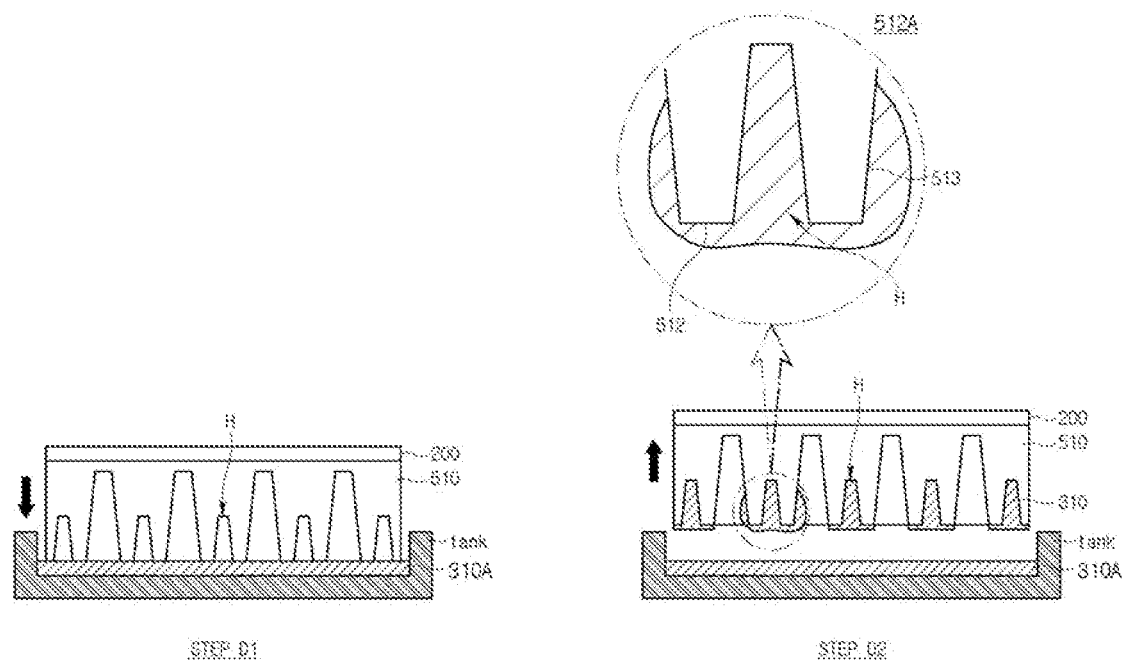
FIG. 18 is a view of a schematic manufacturing method of a viewing angle control film according to another embodiment of the present disclosure.

FIG. 18 is a view of a schematic manufacturing method of the viewing angle control film 10 according to another embodiment of the present disclosure.

The viewing angle control film 10 according to this embodiment of FIG. 18 includes at least one groove H in the lower portion of the louver layer 510. Specifically, at least one groove H is formed on the first surface 512 of the partition wall 511. A portion of the adhesive layer is inserted into the groove H. The adhesive layer covers all of the first surface 512 and a portion of the second surface 513.

The groove H formed in the louver layer 510 can be formed by the imprinting method by additionally forming a groove H pattern on a roller.

Step D1 is a step of slightly contacting the groove H portion of the louver layer 510 to a tank in which the adhesive layer solution 310A is contained. The groove H formed in the louver layer 510 is a microgroove, so that the adhesive layer solution 310A is sucked into the groove H by capillary action.

Step D2 is a step of curing the louver layer 510 that has absorbed a portion of the adhesive layer solution 310A. The adhesive layer can be provided as at least one of a thermally-curable type material and a photocurable type material. Here, due to the feature in that the adhesive layer is formed by a solution process, the adhesive layer can remain in the form of fine burrs as shown in enlarged view 512B. For example, the adhesive layer 310 can cover all of the first surface 512 of the partition wall 511 and also cover a portion of the second surface 513 of the partition wall 511.

Figure 19:
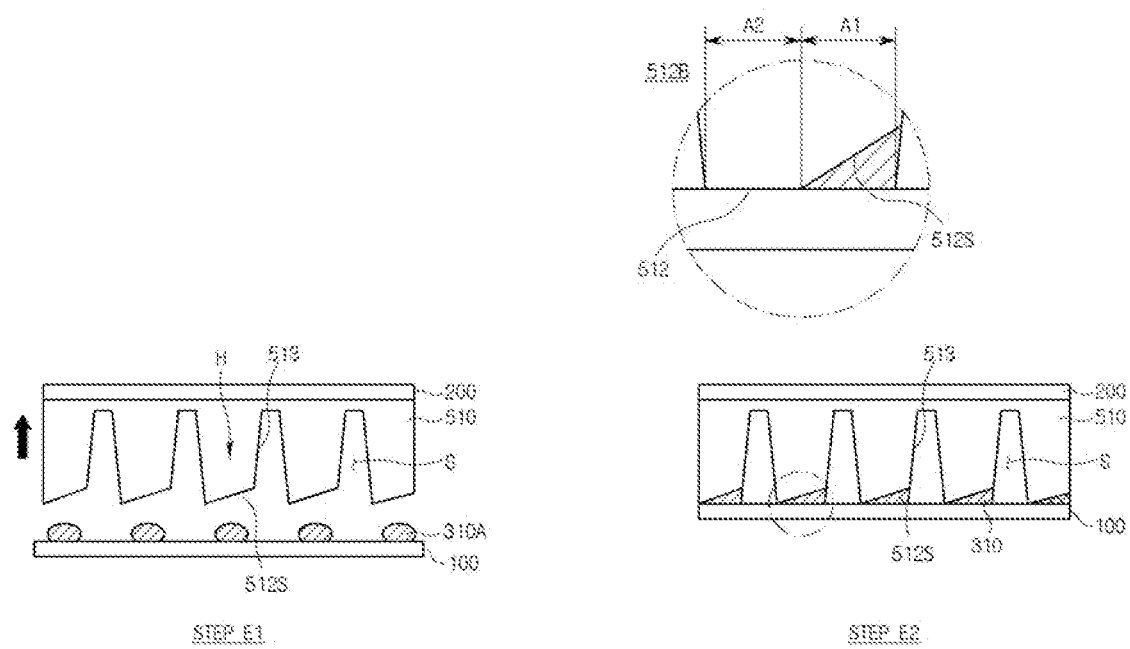
FIG. 19 is a view of a schematic manufacturing method of a viewing angle control film according to another embodiment of the present disclosure.

FIG. 19 is a view of a schematic manufacturing method of the viewing angle control film 10 according to another embodiment of the present disclosure.

Referring to FIG. 19, Step E1 is a step of contacting the louver layer 510 with a pattern of the adhesive layer 310 formed on the first film 100.

The partition wall 511 constituting the louver layer 510 includes an inclined surface 512S having a predetermined inclination angle with respect to the first film 100. The inclined surface 512S can be formed by performing a fine tilting process such that the first surface 512 of the partition wall 511 has the inclined surface 512S by irradiating a laser beam.

The adhesive layer solution 310A applied on the first film 100 is patterned. The patterning of the adhesive layer 310 can be patterned by a dotting or line dispensing method. A width of the adhesive layer 310 is preferably formed to be narrower than a length of the first surface 512 of the partition wall 511 of the louver layer 510. When the width of the adhesive layer 310 is wider than the length of the first surface 512 of the partition wall 511 of the louver layer 510, the adhesive layer 310 can invade a space of the louver layer 510 to which light blocking particles CB is injected to form the containing portion 550.

When the louver layer 510 is brought into contact with the first film 100 to which the adhesive layer solution 310A is applied, the inclined surface 512S of the louver layer 510 forms a fine gap with the first film 100. The adhesive layer solution 310A is sucked into the fine gap formed between the inclined surface 512S of the louver layer 510 and the first film 100 by capillary action.

Step E2 is a step of curing the louver layer 510 that has absorbed a portion of the adhesive layer solution 310A. The adhesive layer 310 can be provided as at least one of a thermally-curable type material and a photocurable type material. Here, the adhesive layer 310 is interposed between a first region A1 of the first surface 512 and the first film 100 as shown in an enlarged view 512B, and a second region A2 of the first surface 512 can be in direct contact with the first film 100.

Figure 20:
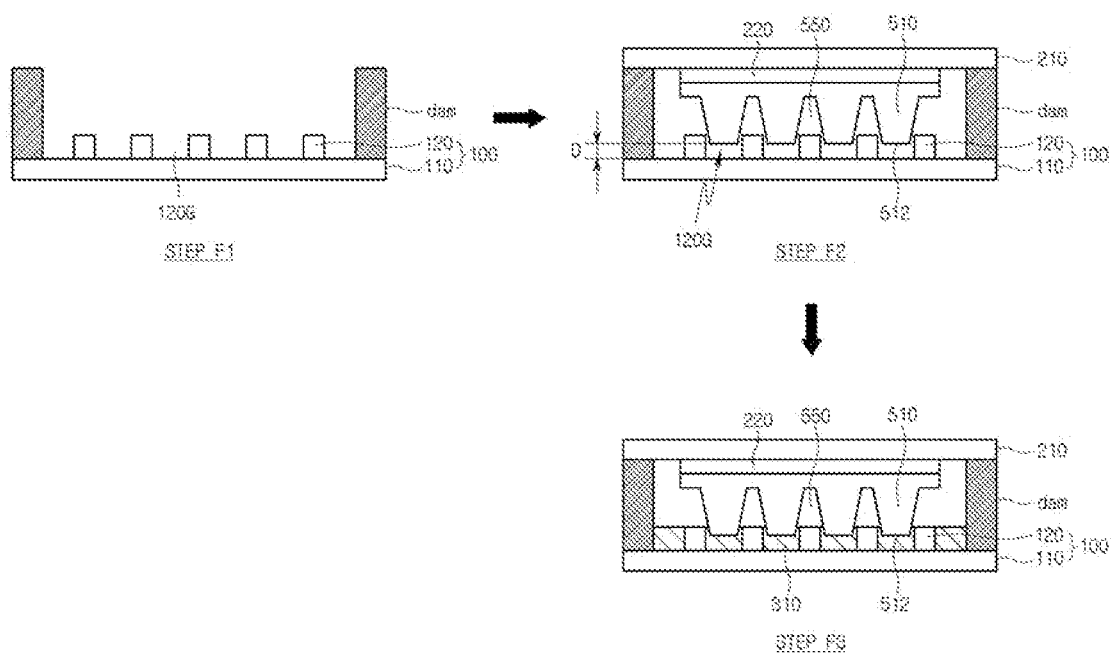
FIG. 20 is a view of a schematic manufacturing method of a viewing angle control film according to another embodiment of the present disclosure.

FIG. 20 is a view of a schematic manufacturing method of the viewing angle control film 10 according to another embodiment of the present disclosure.

Referring to FIG. 20, Step F1 is a step of forming a dam on the side surface area of the first film 100.

Unlike the previous embodiments, the first electrode 120 formed on the first film 100 is formed of a plurality of electrodes spaced apart from each other at regular intervals along the first film 100. A gap 120G between the plurality of electrodes is positioned to correspond to the lower surface 551 of the louver layer 510, and a gap between the gap 120G and the lower surface 551 of the louver layer 510 will serve as a flow path through which the adhesive layer solution 310A will be filled.

Step F2 is a step of laminating the first film 100 and the second film 200. The louver layer 510 is formed on a lower surface of the second film 200. Since the gap between the gap 120G between the first electrodes 120 and the lower surface 551 of the louver layer 510 serves as a flow path through which the adhesive layer solution 310A is filled, the lower surface 551 of the louver layer needs to be spaced apart from the first film 100 by a predetermined distance D.

Step F3 is a step of injecting and curing the adhesive layer solution 310A through the flow path. The flow path through which the adhesive layer solution 310A is injected is formed through the gap between the gap 120G between the first electrodes 120 and the lower surface 551 of the louver layer 510 for the adhesive layer solution 310A.

The steps after Step F3 are the same as Steps A7 and A8 of FIG. 5. Specifically, after injecting the light blocking particles CB so that the light blocking particles CB are contained in the containing portion 550 as in Step A7, the side surfaces of the viewing angle control film 10A is sealed, followed by cutting the edge including a portion of the dam with a laser beam, thereby the viewing angle control film is completed.

As described above, in the viewing angle control film 10 according to the embodiment(s) of the present disclosure, since the adhesive layer adheres the louver layer 510 and the first film 100, and the lower surface 551 of the containing portion 550 is in direct contact with the first film 100, even if the dielectric constant of the adhesive layer 310 is lowered, the electric field applied to the containing portion 550 is not affected thereby. Accordingly, the problem that the driving performance of the private mode of the viewing angle control film 10 is reduced in a low-temperature environment will not occur.

Figure 21:
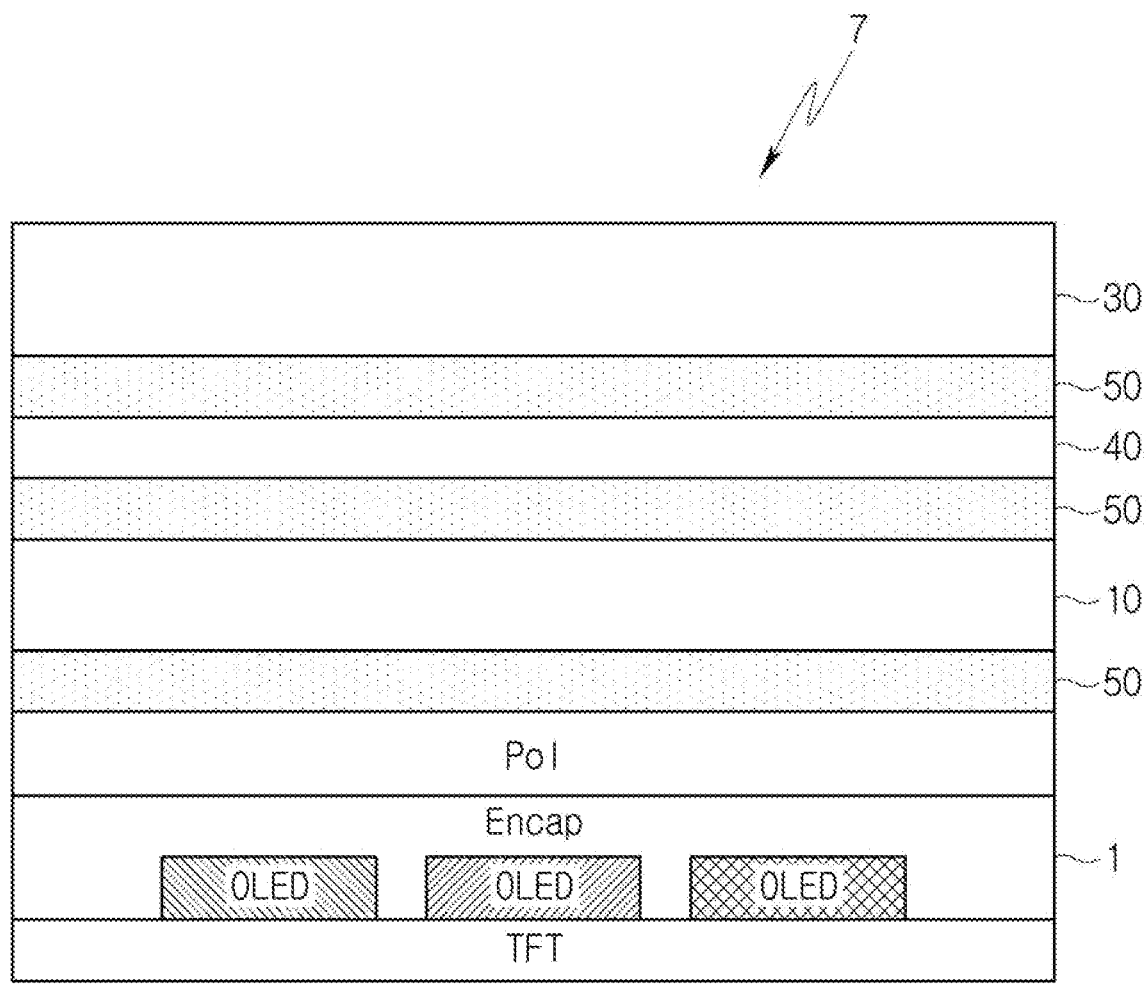
FIG. 21 is a cross-sectional view of a display device according to an embodiment of the present disclosure.

FIG. 21 is a cross-sectional view of a display device according to an embodiment of the present disclosure.

Referring to FIG. 21, a display device 7 can include a display panel 1, the viewing angle control film 10, and a cover substrate 30.

The display panel 1 can include a plurality of pixels disposed in a display area of a base substrate and drivers configured to drive the pixels and disposed in a non-display area around the display area. The pixels can include transistors TFT connected to the drivers through a control signal line and light emitting elements OLED connected to the transistors. The transistors are turned on or off according to a control signal applied through the control signal line, thereby adjusting the amount of current applied to the light emitting elements. The light emitting elements can emit light with a luminance corresponding to the current amount applied through the transistors. The display panel 1 can further include a protective layer (Encap) that encapsulates the light emitting elements OLED and an upper protective substrate Pol.

The viewing angle control film 10 can be disposed on the display panel 1. The viewing angle control film 10 can control a light path generated by the display panel 1 according to the operation mode of the display device 7. For example, when the display device 7 operates in the private mode, which is a first mode, the light conversion layer 500 of the viewing angle control film 10 is controlled as the light blocking mode, so that the view can be opened with respect to the front surface of the display device 7 and the view can be blocked with respect to the side surfaces thereof. In the private mode, the viewing angle control film 10 can be disposed on the display panel to control light emitted from the display panel to be emitted only within a predetermined angle range. When the display device 7 operates in the share mode, which is a second mode, the light conversion layer 500 of the viewing angle control film 10 is controlled as the light-transmitting mode such that the view is opened with respect to the front and side surfaces of the display device 7. In the share mode, the viewing angle control film 10 can control the light emitted from the display panel to be emitted beyond the predetermined angle range.

The cover substrate 30 can be disposed on the viewing angle control film 10. The cover substrate 30 can be provided to protect the display device 7 from external impacts or foreign substances. The cover substrate 30 is a light-transmitting substrate, and can be a rigid substrate including glass or tempered glass, or a flexible substrate made of plastic material.

In an embodiment, the display device 7 can further include a touch panel 40. The touch panel 40 can be configured as a capacitive type or a resistive film type to sense a user's touch input.

The display panel 1, the viewing angle control film 10, the touch panel 40, and the cover substrate 30 can be attached to each other through an adhesive layer 50. The adhesive layer 50 can be an optical clear adhesive (OCA) or an optical clear resin (OCR).

Although embodiments have been described with reference to the accompanying drawings, those of ordinary skill in the art to which the present disclosure pertains will appreciate that the present disclosure can be implemented in other specific forms without changing its technical spirit or essential features. Therefore, it should be understood that the embodiments described above are illustrative in all respects and not restrictive. The scope of the present disclosure is indicated by the scope of the claims, which will be described later, rather than the detailed description, and it will be appreciated that all the changed or modified forms derived from the meaning and scope of the claims and their equivalent concepts are included in the scope of the present disclosure.

What is claimed is:

1. A viewing angle control film comprising:
a first film including a first electrode;
a second film facing the first film and disposed away from the first film by a predetermined distance, the second film including a second electrode;
a light conversion layer disposed between the first film and the second film; and
an adhesive layer bonding the light conversion layer and the first film,
wherein the light conversion layer includes:
a plurality of containing portions disposed at regular intervals along the first film between the first film and the second film;
a louver layer surrounding the plurality of containing portions while spacing the plurality of containing portions and the second film;
light blocking particles provided in each of the plurality of containing portions; and
a primer layer made of an acrylic material,
wherein the primer layer is interposed in at least one of between the first electrode and the adhesive layer, and between the second electrode and the light conversion layer, and
wherein the adhesive layer is partially interposed between the light conversion layer and the first film.

2. The viewing angle control film of claim 1, wherein each of the plurality of containing portions includes:
a lower surface coupled to the first film;
an upper surface spaced apart from the second film; and
side surfaces connecting the lower surface and the upper surface.

3. The viewing angle control film of claim 2, wherein the louver layer surrounds the upper surface and the side surfaces of the corresponding containing portion.

4. The viewing angle control film of claim 2, wherein the first electrode is formed of a plurality of electrodes disposed spaced apart from each other at regular intervals along the first film, and
wherein each of the plurality of electrodes is disposed at a position corresponding to the lower surface of the corresponding containing portion.

5. A display device comprising:
a display panel configured to display an image, and including pixels; and
the viewing angle control film of claim 1,
wherein the viewing angle control film is disposed on the display panel, and operates in a first mode in which light emitted from the display panel is controlled to be emitted only within a predetermined angle range, or in a second mode in which light emitted from the display panel is controlled to be emitted beyond the predetermined angle range.

6. A viewing angle control film comprising:
a first film including a first electrode;
a second film facing the first film and disposed away from the first film by a predetermined distance, the second film including a second electrode;
a light conversion layer disposed between the first film and the second film; and
an adhesive layer bonding the light conversion layer and the first film,
wherein the light conversion layer includes:
a plurality of containing portions disposed at regular intervals along the first film between the first film and the second film;
a louver layer surrounding the plurality of containing portions while spacing the plurality of containing portions and the second film; and
light blocking particles provided in each of the plurality of containing portions, wherein the louver layer includes a plurality of partition walls spaced apart from each other at regular intervals,
wherein each of the partition walls includes:
a first surface coupled to the first film;
a base layer disposed between the plurality of containing portions and the second film; and
second surfaces connecting the first surface and the base layer, and
wherein the adhesive layer covers all of the first surface and a portion of the second surfaces.

7. The viewing angle control film of claim 6, wherein the adhesive layer is interposed between the first surface and the first film, and bonds the louver layer and the first film.

8. The viewing angle control film of claim 7, wherein the first surface includes at least one groove, and
wherein a portion of the adhesive layer is inserted into the at least one groove.

9. The viewing angle control film of claim 7, wherein the adhesive layer is interposed between a first region of the first surface and the first film, and
wherein a second region of the first surface is in direct contact with the first film.

10. The viewing angle control film of claim 7, wherein the first surface has a predetermined inclination angle with respect to the first film.

11. A display device comprising:
a display panel configured to display an image, and including pixels; and
the viewing angle control film of claim 6,
wherein the viewing angle control film is disposed on the display panel, and operates in a first mode in which light emitted from the display panel is controlled to be emitted only within a predetermined angle range, or in a second mode in which light emitted from the display panel is controlled to be emitted beyond the predetermined angle range.

12. A viewing angle control film comprising:
a first film including a first electrode;
a second film facing the first film and disposed from the first film by a predetermined distance, the second film including a second electrode;
a light conversion layer disposed between the first film and the second film; and
an adhesive layer interposed only between the light conversion layer and the first film to bond the light conversion layer and the first film,
wherein the light conversion layer includes:
a plurality of containing portions disposed at regular intervals between the first film and the second film;
a louver layer surrounding the plurality of containing portions while spacing the plurality of containing portions and the second film;
light blocking particles provided in each of the plurality of containing portions; and
a primer layer made of an acrylic material, and
wherein the primer layer is interposed in at least one of between the first electrode and the adhesive layer, or between the second electrode and the light conversion layer.

* * * * *